Dec. 26, 1939.  W. G. NOACK  2,184,845
PULVERIZING, COMBUSTION, AND HEAT TRANSFER PLANT
Filed Feb. 26, 1936  2 Sheets-Sheet 1
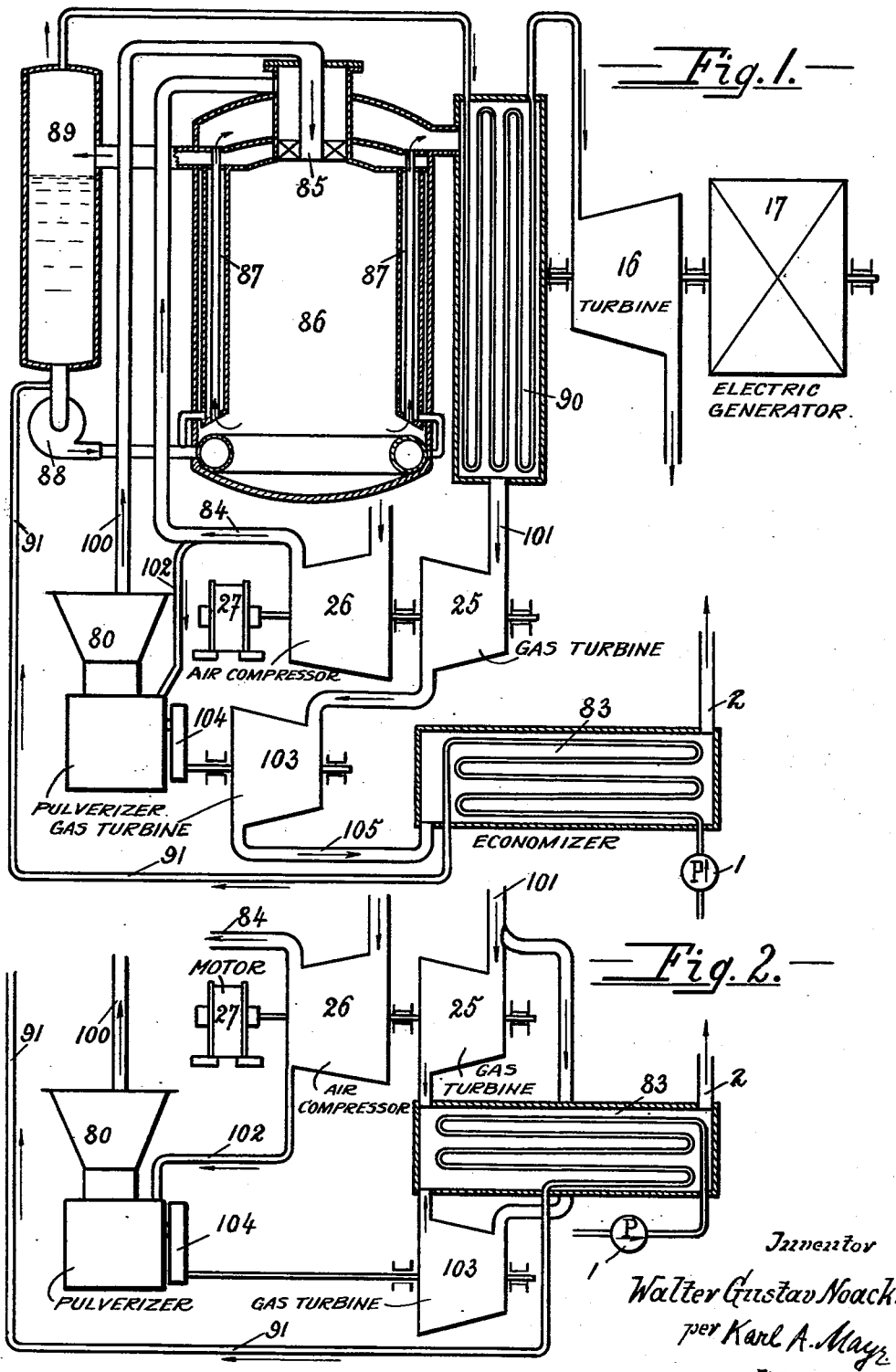

Dec. 26, 1939.  W. G. NOACK  2,184,845
PULVERIZING, COMBUSTION, AND HEAT TRANSFER PLANT
Filed Feb. 26, 1936  2 Sheets-Sheet 2
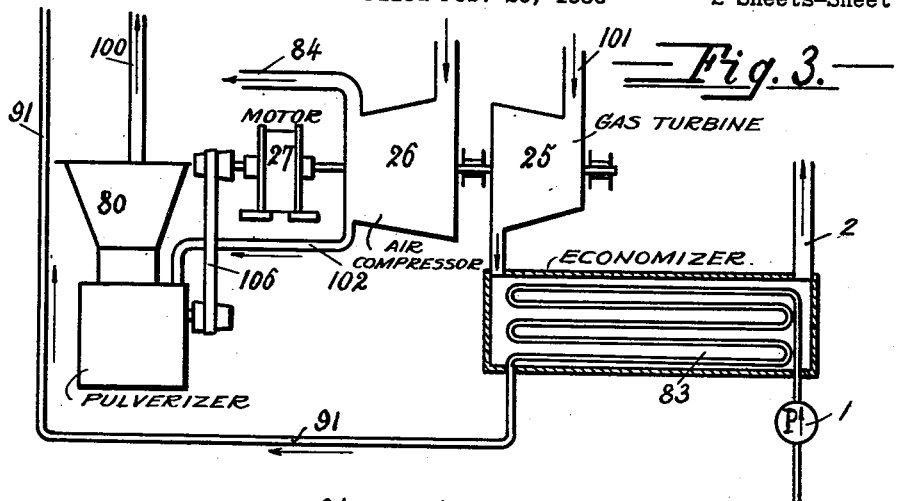
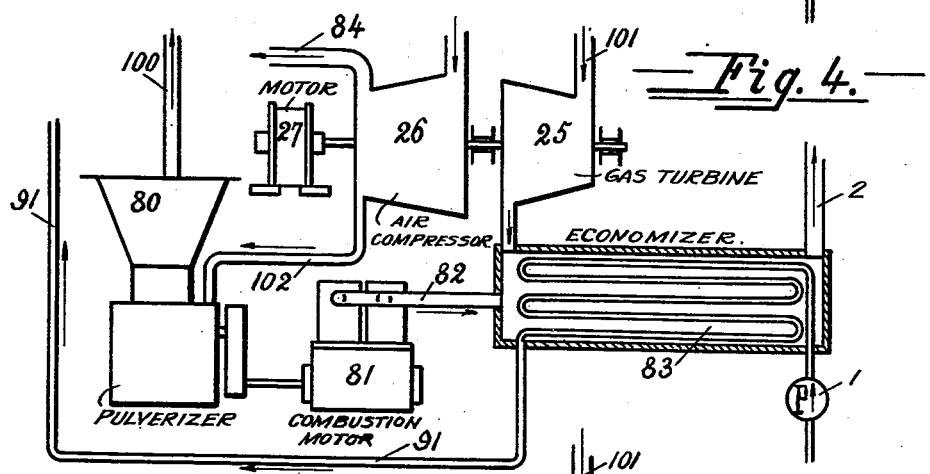
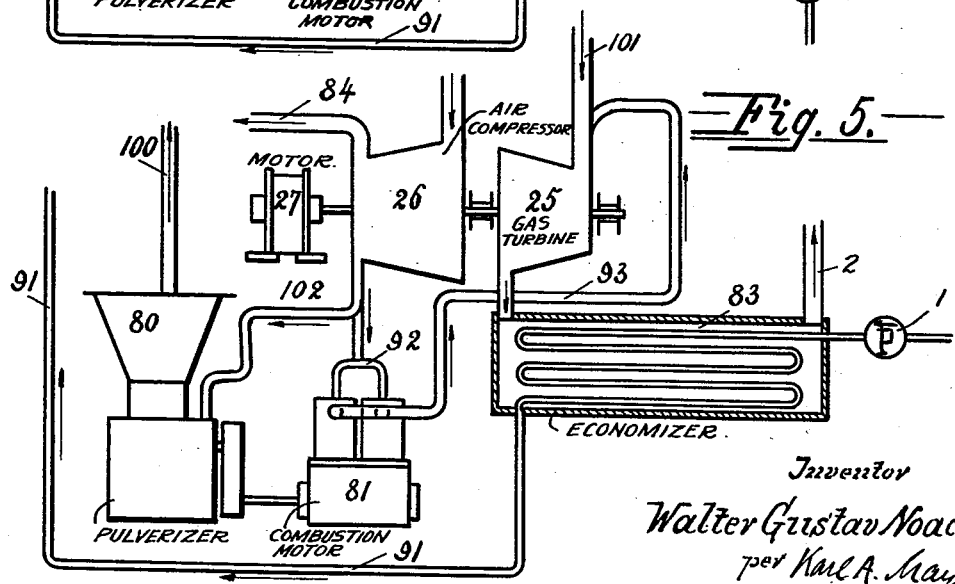
Inventor
Walter Gustav Noack.
per Karl A. Mayr
Attorney.

Patented Dec. 26, 1939

2,184,845

UNITED STATES PATENT OFFICE 2,184,845

PULVERIZING, COMBUSTION, AND HEAT TRANSFER PLANT

Walter Gustav Noack, Baden, Switzerland

Application February 26, 1936, Serial No. 65,815
In Germany August 8, 1933

2 Claims. (Cl. 110—106)

This invention relates to pulverizing plants, more particularly to heat transfer plants comprising pulverizers which supply pulverized fuel for producing the heat required for operating the plant.

This application is a continuation in part application of my application Ser. No. 738,314, filed August 3, 1934, which matured in Patent No. 2,055,385 of September 22, 1936.

An object of the present invention resides in the provision of a pulverizing plant of the character referred to in which the energy required for the pulverizing process is reduced and heat energy produced in or supplied to and not used in the pulverizing plant is introduced into and efficiently used by the plant which is served with fuel pulverized in said pulverizing plant.

Another object of this invention is the provision of a pulverizing plant of the character referred to comprising all means required to produce the energy for operating the plant, whereby the fineness of the substance to be pulverized can be increased to any required degree without considerably increasing the initial energy requirements of the plant.

A further object of the present invention is to provide a pulverizing plant of the character referred to in which the pulverizer is directly connected with a heat consumer which efficiently uses heat generated in or available from the pulverizing plant.

Another object of the present invention resides in the provision of a heat transfer plant comprising a combustion chamber in which high pressure combustion gases are produced and a pulverizing plant for pulverizing the fuel with which said combustion chamber is fired and in which part of said high pressure combustion gases are used for operating said pulverizing plant.

Further and objects of this invention will be hereinafter set forth in the accompanying specification and claims and shown in the drawings which, by way of illustration, show what I now consider to be a preferred embodiment of my invention.

According to the invention, the energy required for the pulverizing process is directly or indirectly derived from the expansion of the products of combustion of matters pulverized in said pulverizing process. If, for example, the pulverizer is driven by a gas turbine which is operated by the waste heat generated in a plant using the coal pulverized in said pulverizer, almost the total power requirements of the pulverizer are obtained without cost. The plant may be a steam power plant in which the boilers are fired with powdered coal from the pulverizer and at high pressure in the combustion chamber, and the combustion gases of the boiler are used for driving a gas turbine operating the mill. The exhaust gases of the gas turbine may be reintroduced into suitable passes of the boilers for efficient use of their heat content.

In the drawings:

Fig. 1 illustrates a diagrammatic layout of a plant according to the present invention in which the combustion gases of a boiler furnace are used for driving a gas turbine for driving the blower for the combustion air and a turbine for operating a coal pulverizer.

Fig. 2 illustrates a diagrammatic layout of a modified plant according to my invention and showing only those parts of the plant which are arranged in a manner different from the plant shown in Fig. 1.

Fig. 3 illustrates a diagrammatic layout of the pulverizing part and its drive of another modified plant according to the present invention in which the pulverizer is driven by the same gas turbine which also drives the blower for the combustion air.

Fig. 4 illustrates a diagrammatic layout of the pulverizing part and its drive of another modification of a plant according to my invention in which the pulverizer is driven by an internal combustion engine, the exhaust of which is used for heating a part of the steam boiler.

Fig. 5 illustrates a diagrammatic layout of a modification of the plant shown in Fig. 4.

Like numerals indicate like parts in all figures of the drawings.

Referring more particularly to Fig. 1 of the drawings: 80 represents a mechanical pulverizer which supplies powdered coal through conduit 100 to the burner 85 of the combustion chamber 86 of a pressure fired steam generator; instead of the steam generator shown in Fig. 1, a generator may be used of the type disclosed in U. S. Patent No. 1,948,539 which is built according to the same general principles as the boiler shown in Fig. 1 of the present application. In the generator disclosed in Patent No. 1,948,539, conduit 107 corresponds to conduit 100 and burner 105 to burner 85 of the present application. The products of combustion pass through the evaporating boiler elements 87 and therefrom through steam superheater 90. They leave this superheater through conduit 101 and enter a gas turbine 25 which drives blower 26; the latter supplies high pressure combustion air through conduit 84 to burner 85 and—through conduit 102—supplies air also to pulverizer 80 which is used for blowing the pulverized coal through conduit 100 into burner 85. A motor 27 is provided for driving the blower 26 when starting up the plant and in emergencies. The exhaust gases of turbine 25 are conducted into another gas motor 103 which drives through a reduction gear 104 the mechanical pulverizer 80. The exhaust gases of the gas motor 103 are conducted through conduit 105 into a heat exchanger 83 which, in the application of my invention shown in Fig. 1, is an economizer for warming up the feed water for the steam generator. The gases are finally discharged through conduit 2.

The flow of water and steam through the plant is as follows: feed pump 1, economizer 83, conduit 91, steam separating chamber 89, in the lower part of which the water collects and forms a water level from which the steam is released and fills the upper part of chamber 89; from the lower part of chamber 89 water is circulated by means of circulating pump 88 into the evaporating elements 87 and therefrom together with steam which may have been raised in elements 87 back into the steam separating chamber 89; the steam separated in chamber 89 is conducted from the upper part of said chamber into superheater 90 and therefrom into steam turbine 16 which may drive an electric generator 17.

A modified plant according to my invention is illustrated in Fig. 2. Whereas in the plant according to Fig. 1 the two gas turbines 25 and 103 are arranged in series with respect to the gas flow, in the plant according to Fig. 2 turbines 25 and 103 are arranged in parallel with respect to the flow of the gases. Otherwise the plant according to Fig. 2 is like that one shown in Fig. 1 and the steam generating part is not shown in Fig. 2 because it would be only a true copy of what is shown in Fig. 1.

In the plant according to Fig. 3 the pulverizer is driven by the gas turbine 25 and no special turbine is provided for operating the pulverizer. In order to be able to take care of the differences in speed or power requirements of the pulverizer as compared with the speed or power requirements of blower 26, a variable gear transmission 106 may be provided in between the driving shaft and the shaft of the pulverizer.

In the plant according to Fig. 4 the pulverizer is driven by a combustion motor 81, the exhaust gases of which are conducted into economizer 83 by means of conduit 82 and aid in heating the economizer.

In the plant according to Fig. 5 the pulverizer is also driven by a combustion motor 81. This, however, is supercharged through conduit 92 by high pressure air from blower 26 and exhausts through conduit 93 into conduit 101; the exhaust gases of motor 81 thus aid in the operation of turbine 25.

While I believe the above described embodiments of my invention to be preferred embodiments, I wish it to be understood that I do not desire to be limited to the exact details of process, design and construction shown and described, for obvious modifications will occur to a person skilled in the art.

I claim:

1. In combination, a combustion and heat transfer plant producing hot, high pressure gases, a mechanical pulverizing plant for grinding the fuel to be burnt in said combustion plant, a fuel conduit connecting said combustion plant and said pulverizing plant for conducting the pulverized fuel into said combustion plant, a gas machine connected to and operating said pulverizing plant and discharging a hot fluid, a conduit directly interconnecting said machine and said heat transfer plant for uniting said discharged hot fluid with the high pressure gases produced in said combustion plant, air compression means, and a gas turbine connected to and operating said air compression means and being connected to said combustion plant for receiving hot, high pressure operating gases therefrom, said air compression means being connected with said combustion plant and supplying combustion air thereto and being connected with said pulverizing plant for supplying compressed air thereto for blowing the pulverized fuel from said pulverizing plant through said fuel conduit into said combustion plant.

2. In combination, a combustion plant producing hot heating gases, a plurality of heat consumers which are connected to said combustion plant and adapted to be heated by said gases, a pulverizing plant for grinding the fuel to be burnt in said combustion plant, a fuel conduit connecting said pulverizing plant and said combustion plant for conducting pulverized fuel to said combustion plant, power means for operating said pulverizing plant, said means discharging a hot fluid, a conduit connecting said means and one of said heat consumers for conducting the hot fluid discharged by said power means into said heat consumer, air compression means, a gas turbine connected to and operating said air compression means and being connected to and adapted to be operated by hot gases produced in said combustion plant, an exhaust gas conduit connecting said gas turbine and one of said heat consumers for heating said consumer, said air compression means being connected with said combustion plant and supplying combustion air thereto and being connected with said pulverizing plant for supplying compressed air thereto for blowing the pulverized fuel from said pulverizing plant through said fuel conduit into said combustion plant.

WALTER GUSTAV NOACK.